United States Patent [19]

Dusza

[11] 4,171,926

[45] Oct. 23, 1979

[54] LENS CUTTER

[75] Inventor: Robert J. Dusza, Southbridge, Mass.

[73] Assignee: American Optical Corporation, Southbridge, Mass.

[21] Appl. No.: 898,749

[22] Filed: Apr. 21, 1978

[51] Int. Cl.² .......................... B26D 1/12; B27G 13/00
[52] U.S. Cl. .................................... 407/52; 407/31; 407/55; 407/61; 144/218
[58] Field of Search .............. 407/30, 31, 32, 33, 407/44, 47, 49, 51, 52, 55, 58, 60, 61; 144/218, 221, 222, 223, 236, 237

[56] References Cited

U.S. PATENT DOCUMENTS

| | | | |
|---|---|---|---|
| 2,646,611 | 7/1953 | Bauer | 407/52 |
| 2,810,189 | 10/1957 | See et al. | 407/31 |
| 2,963,060 | 12/1960 | Walther | 144/218 |
| 3,061,910 | 11/1962 | Chamberlin | 407/52 |
| 3,138,847 | 6/1964 | Berry Jr. | 407/58 |
| 3,729,808 | 5/1973 | Wolf et al. | 407/51 |
| 3,899,813 | 8/1975 | Lovendahl | 407/51 |
| 3,976,112 | 8/1976 | Rowlson et al. | 144/223 |
| 3,986,543 | 10/1976 | Slayton et al. | 407/31 |
| 4,009,637 | 3/1977 | Bittner | 407/31 |

*Primary Examiner*—Harrison L. Hinson
*Attorney, Agent, or Firm*—Jeremiah J. Duggan; Alan H. Spencer; Stephen A. Schneeberger

[57] ABSTRACT

A cutter for edging plastic lenses to desired finished shapes and sizes including a main supporting wheel having an effective cutting edge formed of a multiplicity of circumferentially spaced replaceable cutting blades for clean chip clearance and ready accessibilty to individual removal sharpening and/or replacement as needed.

4 Claims, 8 Drawing Figures

LENS CUTTER

FIELD OF THE INVENTION

Lens edging apparatus with particular reference to improvements in cutting wheels for edging plastic lenses.

DESCRIPTION OF THE PRIOR ART

While the traditional abrasive or diamond charged lens edging wheels continue to serve the needs of glass lens edging operations, the ever increasing popularity of ophthalmic lenses formed of resins and plastics has created a serious need for new, more efficient and reliable edging apparatuses, i.e. cutters designed to overcome the problems of plastic gumming and tool loading.

Heat generated by friction in the grinding of plastics with abrading tools causes a softening of the material which progressively worsens during an edging operation as a result of loading (clogging) of the tools with the removed material. If allowed to continue without frequent grinding wheel dressing lens warpage, discoloration and/or other damage can result.

Attempts to overcome these and relatated problems of working with plastic lens materials have involved the use of milling operations e.g. as in U.S. Pat. No. 3,769,755.

While milling, rather than grinding, may lessen the problems of tool loading when working with thin plastic lenses, for example, there is a serious need in the art for more dependable clean-cutting, long-lasting and economical tooling for plastic lens edge profiling.

Accordingly, it is an object of this invention to provide tooling for plastic edge profiling wherewith clean cut and accurately shaped lens edge contours may be rapidly accomplished with reliable repetition and minimal cost.

Another object is to accomplish the foregoing with tooling which is adaptable to most, if not all, lens edging machinery Still another object is to provide machine tooling wherewith a plurality of different lens edge geometries may be cut with a single tool.

Other objects and advantages of the invention will become more readily apparent from the following description.

SUMMARY OF THE INVENTION

The foregoing objects and their corollaries are accomplished by the provision of an edging wheel in the form of a fly cutter, the effective cutting edge of which comprises a multiplicity of circumferentially spaced cutting blades. The blades afford unobstructed chip clearance during plastic lens edging and are readily individually accessible for adjustment, removal, reconditioning and/or replacement.

A particular embodiment of the invention includes staggered cutting blades designed to alternately cut first one side of a lens edge and then the other side wherewith, by proper relative alignment of the staggered blades on the wheel, it becomes possible to cut an edge of beveled configuration with optimum chip clearance.

Further contemplated is the addition to the aforesaid cutting wheel of a juxtapositioned second or auxiliary wheel component having circumferentially spaced cutting blades against which a flat surface may be cut about the lens edge.

Details of the invention will become more readily apparent from the following description when taken in conjunction with the accompanying drawings.

IN THE DRAWINGS

DESCRIPTION OF THE PREFERRED EMBODIMENTS

Figure 1:
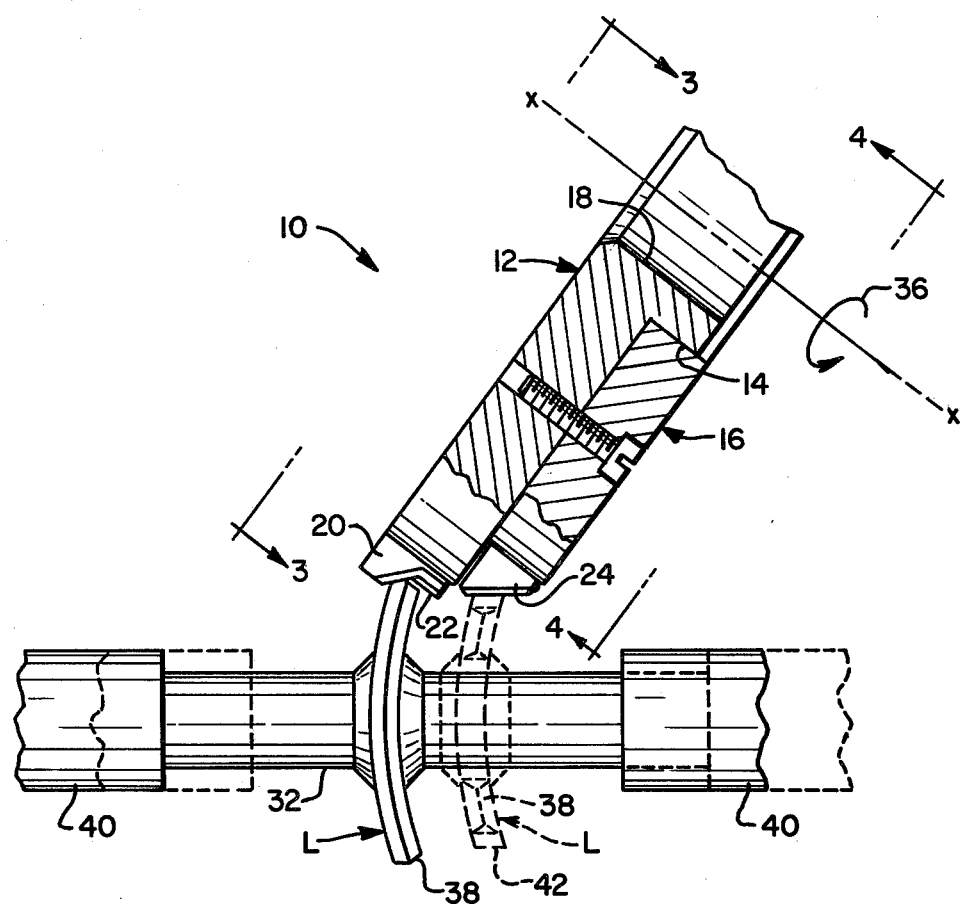
FIG. 1 is a partially cross-sectioned illustration of a lens cutter which, according to a preferred embodiment of the invention, is designed to selectively perform the dual function of cutting beveled and flat lens edge configurations when employed in lens edging apparatus as diagrammatically illustrated.
Figure 2:
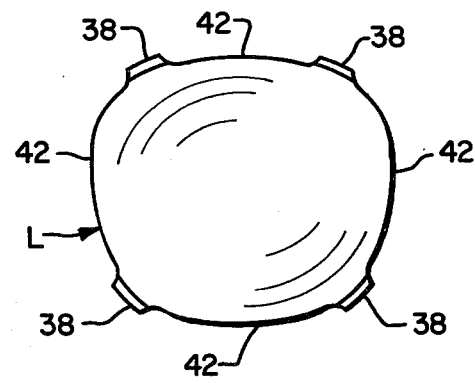
FIG. 2 is a front elevational of view of the lens illustrated in FIG. 1 after final edge contouring to the configuration shown by broken lines in FIG. 1.
Figure 3:
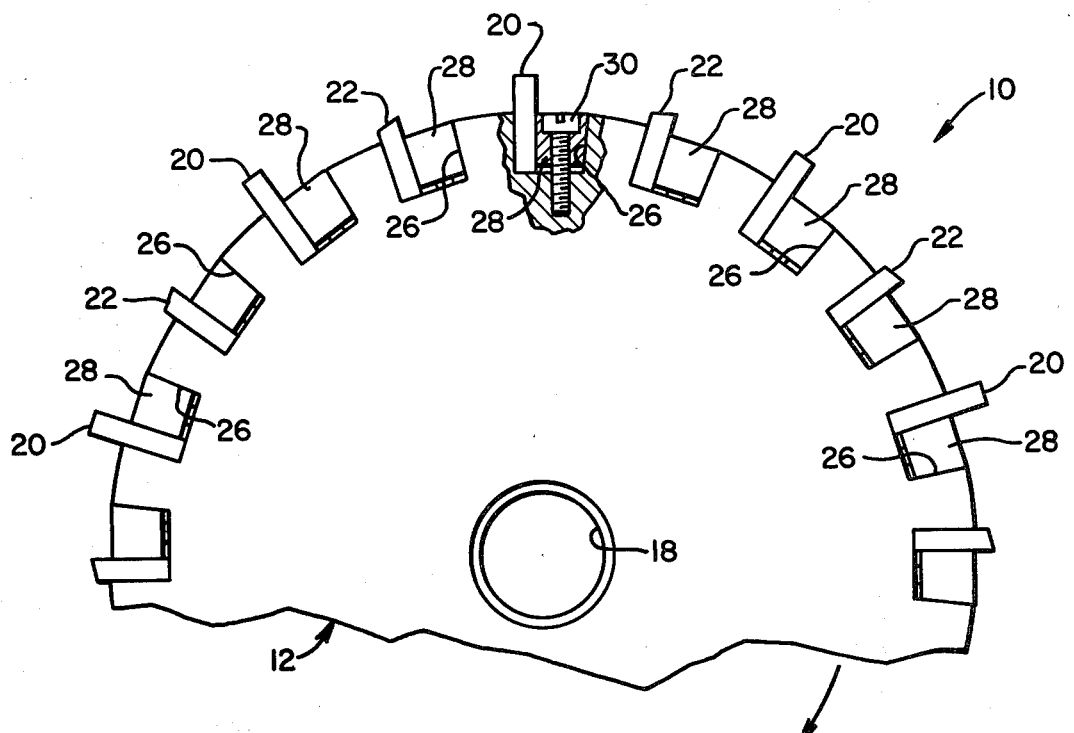
FIG. 3 is a fragmentary elevational view of one side of the lens cutter of FIG. 1 taken from line 3—3 and looking in the direction of the arrows.
Figure 4:
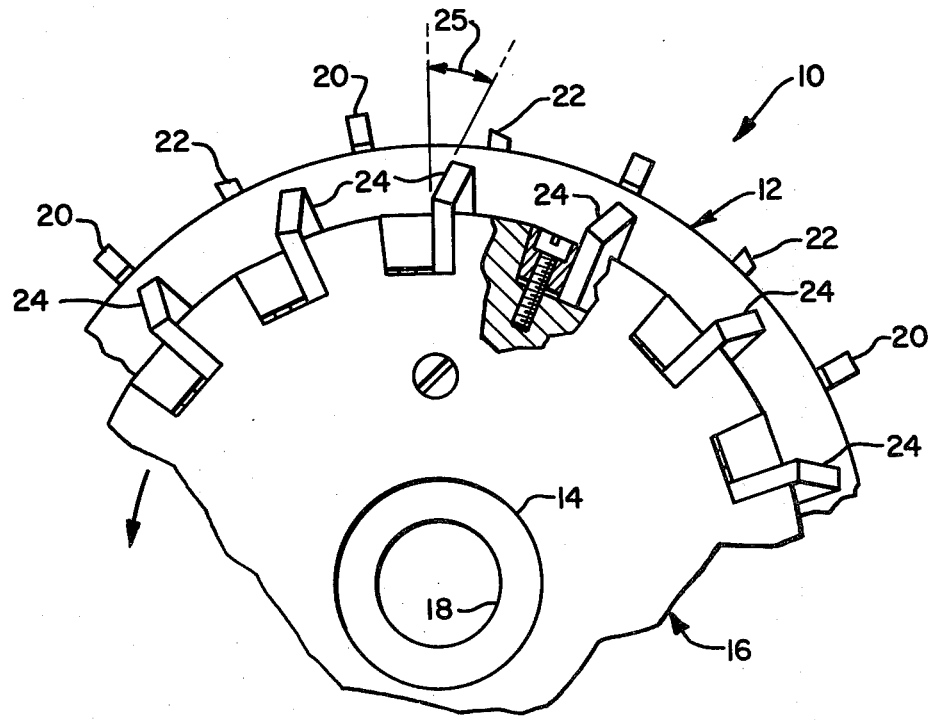
FIG. 4 is a fragmentary elevational view of the opposite side of the lens cutter taken from line 4—4 and looking in the direct of the arrows.
Figure 5:
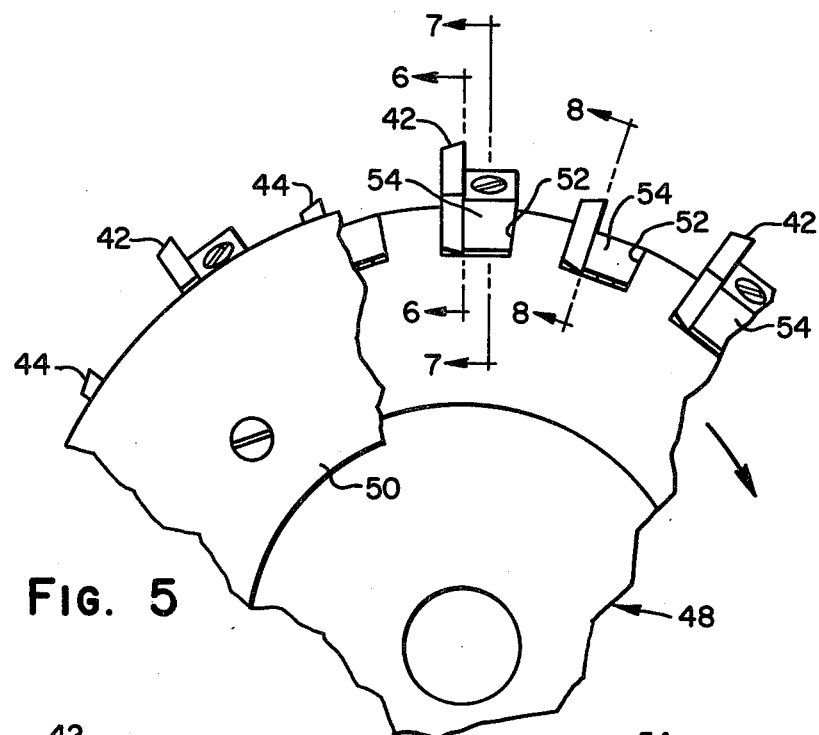
FIG. 5 is a fragmentary elevational view of one side of a modification of the invention.

Referring more particularly to FIGS. 1, 3 and 4, lens cutter 10 can be seen as comprising a main supporting body in the form of a main wheel 12 having hub 14 onto which auxiliary wheel 16 is mounted. Hub 14 is provided with bore 18 through which a suitably driven edging machine spindle (not shown) would normally be extended for rotating cutter 10 about x—x.

Cutter 10, in being more specifically designed for edging lenses formed of resinous or plastic materials such as allyldiglycolcarbonate and polycarbonate, for example, is provided with circumferentially spaced peripherally exposed cutting blades 20 and 22 on wheel 12 and blades 24 on wheel 16.

Recesses 26 are provided in wheel 12 into each of which one of blades 20 and 22 is inserted and held with a keeper 28. In each case, keeper 28 is slightly tapered to wedge blades 22 and 24 tightly into place within recesses 26 by the tightening of a holding screw 30, only one of which is illustrated in the cross-sectioning of FIG. 3. All other keepers 28 are similarly tightened.

Removal of screws 30 and keepers 28 releases blades 20 and 22 for adjustment, sharpening and/or replacement.

Blades 20 and 22 are staggered, i.e. alternately positioned about wheel 12, with the effective cutting edges of blades of each successive pair so relatively oriented as to form the configuration of a V for use in cutting a bevel upon a lens L to be edged as shown in FIG. 1.

Referring to FIGS. 1 and 3, it can be seen that ample chip clearance is provided between successive blades 20 and 22. Blades 20 are used to cut one side only of the lens edge bevel while blades 22 cut the other side of the bevel. Space between these staggered blades thereby allows a free fall of chips away from wheel 10. The low friction slicing or cutting action of blades 20, 22 and 24 along with freedom from chip loading prevents overheating and/or gumming of the lens material. Suitable rake angles (e.g. 15°) are provided along cutting edges of all blades.

Blades 24 on wheel 16 being similarly mounted in recesses 26a and held by keepers 28a with screws 30a also provide unobstructed chip clearance and the relatively low friction cutting action needed to prevent lens material from gumming and/or loading.

As depicted in FIGS. 1 and 4, blades 24 may be used to cut a flat edge on lens L. They are preferably, but not necessarily, angled in recesses 26a slightly away from the direction of rotation of wheel 16 to provide a cutting angle 25 which enhances the cutting action.

In a lens edging operating performed according to the invention, a lens L is clamped to sporting arbor 32 wherewith it is rotated as indicated by arrow 34 (FIG. 1) while cutter 10 is rotated about its axis x—x as indicated by arrow 36. By moving arbor 32 toward and away from cutter 10 as it is rotated, lens L is brought to final size and shape with beveled edge 38.

Should a flat lens edge be desired, carriage 40 which supports arbor 32 may be moved laterally to cause lens L to engage blades 24 of wheel 16, e.g. as shown with broken lines in FIG. 1. In this illustration, the flat edge 42 is formed only partially about the lens edge leaving segments of the previously formed beveled edge in place. The flat edge 42 may, of course, be caused to continue completely about the lens edge if desired. In such a case, the beveling operation would normally be dispensed with.

Those interested in greater details of mechanisms for clamping, rotating and caming ophthalmic lenses toward and away from lens edging wheels may refer to U.S. Pat. Nos. 2,674,068; 2,723,502; 3,119,206; and 3,332,172, for example.

The modification of the invention depicted in FIGS. 5-8 utilizes cutting blades each having a multiplicity of sharpened cutting edges allowing them to be turned from one such edge to another as wear takes place and fresh cutting edges are required.

Blades 42 and 44 which may be used for producing a beveled lens edge are rectangular while blades 46 for cutting flat lens edges are preferably triangular.

Figure 7:
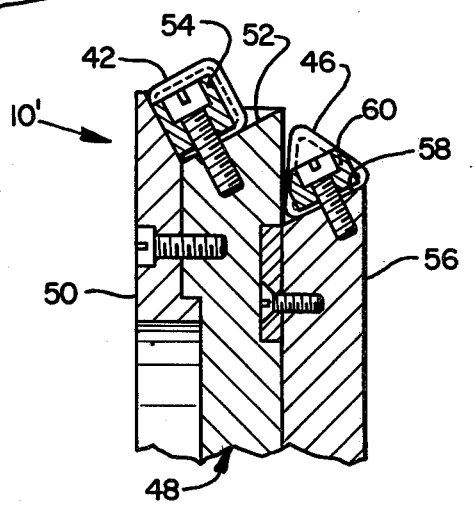
FIG. 7 is a fragmentary cross-sectional view taken approximately along line 7—7 of FIG. 5.
Figure 8:
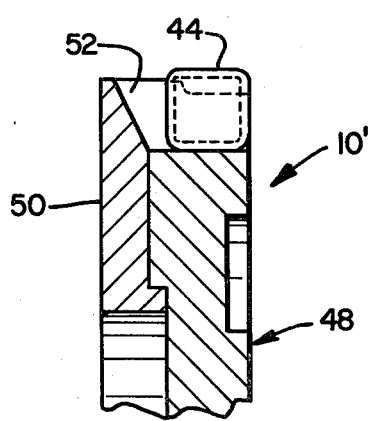
FIG. 8 is a fragmentary cross-sectional view taken approximately along line 8—8 of FIG. 5.

Main wheel 48 of cutter 10' having blade support 50 fastened thereto is provided with pockets 52 into which blades 42 and 44 are placed and held with keepers 54 (FIG. 7).

Auxiliary wheel 56 which supports triangular blades 46 is similarly provided with blade-receiving pockets 58 and keepers 64 releasably fixing the blades in place. Wheel 56 is fastened to wheel 48.

Figure 6:
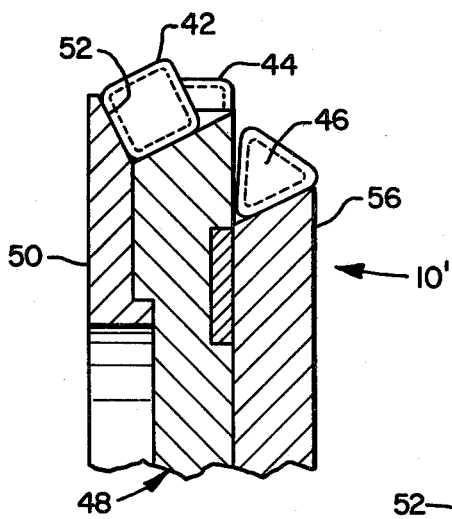
FIG. 6 is a fragmentary cross-sectional view taken approximately along line 6—6 of FIG. 5.

As it can be seen in FIG. 6, blades 42, 44 and 46 provide the lens edging configurations afforded by blades 20, 22 and 24 of the embodiment of the invention illustrated in FIGS. 1, 3 and 4.

Those skilled in the art will readily appreciate that there are various modifications and adaptations of the precise forms of the invention here shown and described that may suit particular requirements. Accordingly, the foregoing illustrations are not to be interpreted as restrictive of the invention beyond that necessitated by the following claims.

I claim:

1. A bevel cutter for edging plastic lenses comprising:
    a main wheel having a succession of spaced circumferential recesses;
    a cutting blade in each of said recesses, said blade having a straight cutting edge positioned outwardly of the recess, the straight edges of blades in alternate recesses of said succession being acutely angled, one in a direction toward the other, to the extent of forming an included angle corresponding to that desired upon an edge of a lens to be cut, said angle opening outwardly away from the circumference of said wheel; and
    means for keeping said blades releasably fixed in said recesses;
    whereby opposite sides of said edge of said lens may be continuously alternately cut to the angle of correspondingly angled blade edges with substantial chip clearance afforded between said succession of cutting edges of said blades when said lens and blades of said wheel are brought into engagement with one another.

2. A lens cutter according to claim 1 including an auxiliary wheel coaxial with and fixed to said main wheel, said auxiliary wheel having a plurality of spaced circumferential recesses and an auxiliary cutting blade in each of said recesses extending partially outwardly thereof, said outward extensions of said auxiliary blades each having an exposed cutting edge extending across the major portion of the width of said auxiliary wheel, and
    means for keeping said auxiliary blades fixed in a desired orientation within said receses, said means being selectively releasable for removal and replacement of said auxiliary blades.

3. A lens cutter according to claim 2 wherein said cutting edges of said auxiliary blades are straight and substantially equally radially spaced from said axes of said coaxial main and auxiliary wheels.

4. A lens cutter according to claim 3 wherein said cutting edges of said auxiliary blades are inclined in a direction away from said main wheel toward its axis.

* * * * *